No. 843,704. PATENTED FEB. 12, 1907.
R. A. SCHINDLER.
NUT LOCKING WASHER.
APPLICATION FILED NOV. 22, 1906.

Witnesses
Gilson Shaffer
Laura S. Inman

Inventor
Robert A. Schindler
By his Attorney Edward R. Inman

UNITED STATES PATENT OFFICE.

ROBERT A. SCHINDLER, OF PITTSBURG, PENNSYLVANIA.

NUT-LOCKING WASHER.

No. 843,704.  Specification of Letters Patent.  Patented Feb. 12, 1907.

Application filed November 22, 1906. Serial No. 344,600.

*To all whom it may concern:*

Be it known that I, ROBERT A. SCHINDLER, a citizen of the United States, residing at Pittsburg, in the county of Allegheny and State of Pennsylvania, have invented certain new and useful Improvements in Nut-Locking Washers, of which the following is a specification, reference being had therein to the accompanying drawings.

My invention relates to an improved nut-locking washer, the object, construction, and operation of which is fully set forth in the following specification, reference being had to the accompanying drawings, which form a part hereof, and in which—

Figure 1:
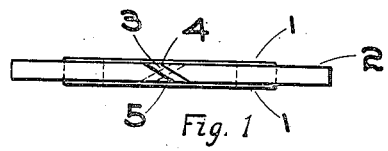
Figure 2:
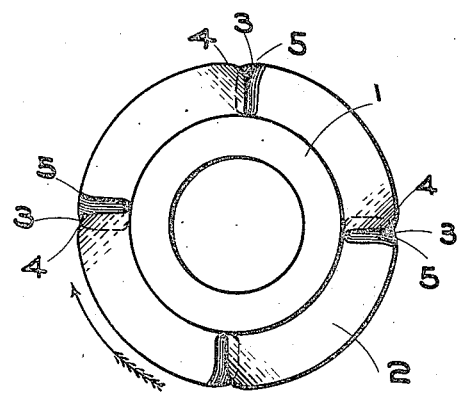
Figure 3:
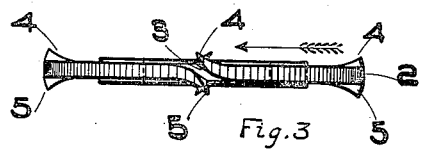
Figure 4:
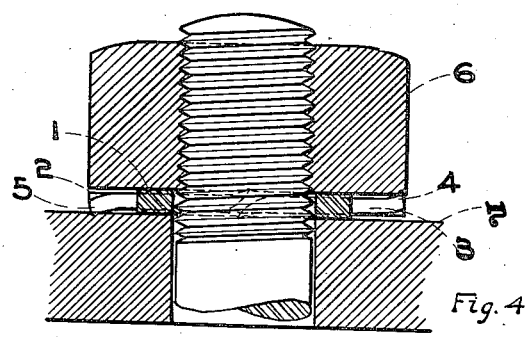

Figure 1 is an edge view of my washer before the wings are bent to form the lock. Fig. 2 is a plan view of my complete washer. Fig. 3 is an edge view of same. Fig. 4 shows one of my washers in position under a nut.

Applicant is aware that a number of nut-locking washers have been patented which embody in various modified forms the locking principle which applicant here shows; but in applicant's device is embodied the novel feature, a thick central annular boss with the thinner wings surrounding the same, which wings are constructed to effect the locking function of my device.

The construction of my device is substantially as follows: Surrounding the bolt-hole of my washer is an annular boss 1, which is formed upon each face of the washer. Surrounding said boss is a thinner portion 2. Through said thin portion of the washer one or more angular radial cuts 3 are made, and the acute engaging edges 4 and 5, which are formed by this cut, are carried outward away from each other, so that said engaging edges project beyond the respective faces of the boss 1, so that when the washer is in place the opposing faces of the nut 6 and the holden material 7 are engaged by said edges. All the pressure upon the washer due to screwing up the nut is sustained by the bosses 1. Hence the engaging edges 4 and 5 are not crushed or flattened down, as they are in other forms of washers, but retain very nearly their original conformation and elasticity.

Referring to Figs. 2 and 3, it will be readily noted that a nut could be easily screwed down upon the washer when turned in the direction indicated by the arrow without being engaged by the edges 4 or 5; but when said nut tends to turn in the opposite direction said edges would engage both the nut and the holden material and prevent the nut from unscrewing.

The construction of my washer is such as to readily engage the approximate or opposing surfaces of both the nut and the holden material without any special preparation of said surfaces. Hence they may both be plain surfaces, which greatly increases the utility and applicability of my washer.

Having thus described my invention, what I claim, and desire to secure by Letters Patent, is—

A nut-locking washer, having upon each face an annular boss about the bolt-hole thereof and a thinner portion surrounding said boss, there being one or more angular, radial cuts in said thinner portion, the acute edges formed by said cut being carried outward in opposite directions beyond the respective faces of said boss for the purpose set forth, in combination with a nut and holden material having plain opposing surfaces.

In testimony whereof I affix my signature in presence of two witnesses.

ROBERT A. SCHINDLER.

Witnesses:
  MARSHALL PHIPPS,
  E. M. SWYERS.